Dec. 15, 1931.　　　　　P. FLATON　　　　　1,836,460
APPARATUS FOR MAKING PISTON RINGS
Filed May 12, 1930　　3 Sheets-Sheet 2
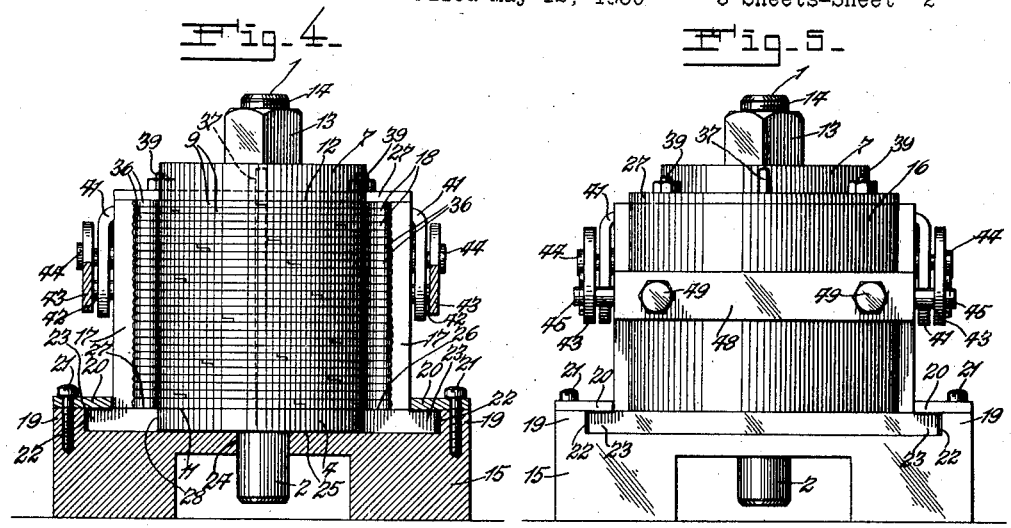
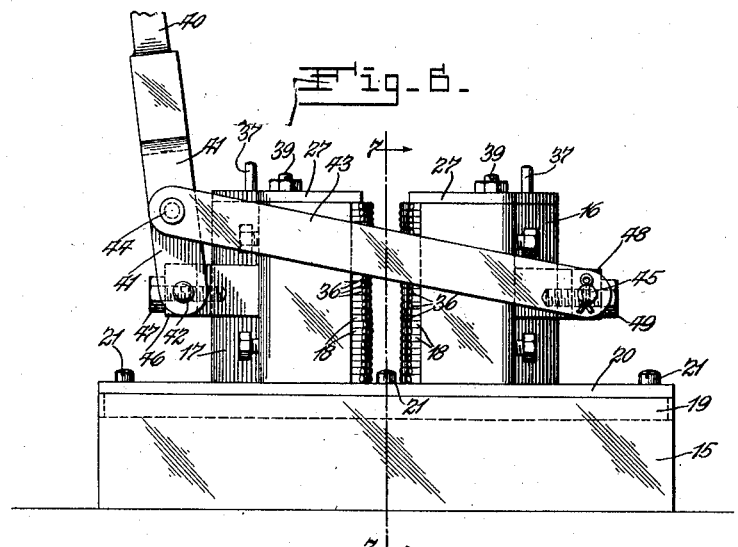
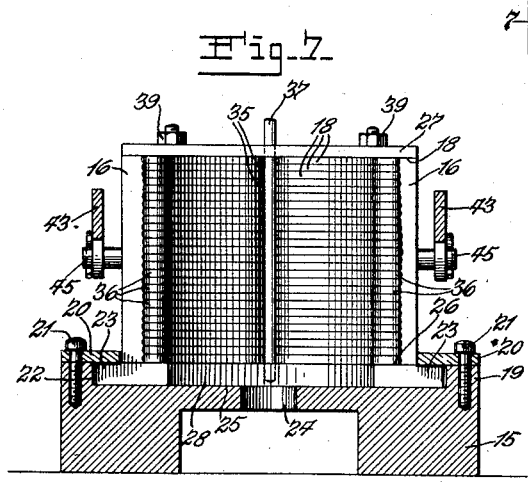
Inventor:
Peter Flaton,
by Hippey & Kingsland.
His Attorneys.

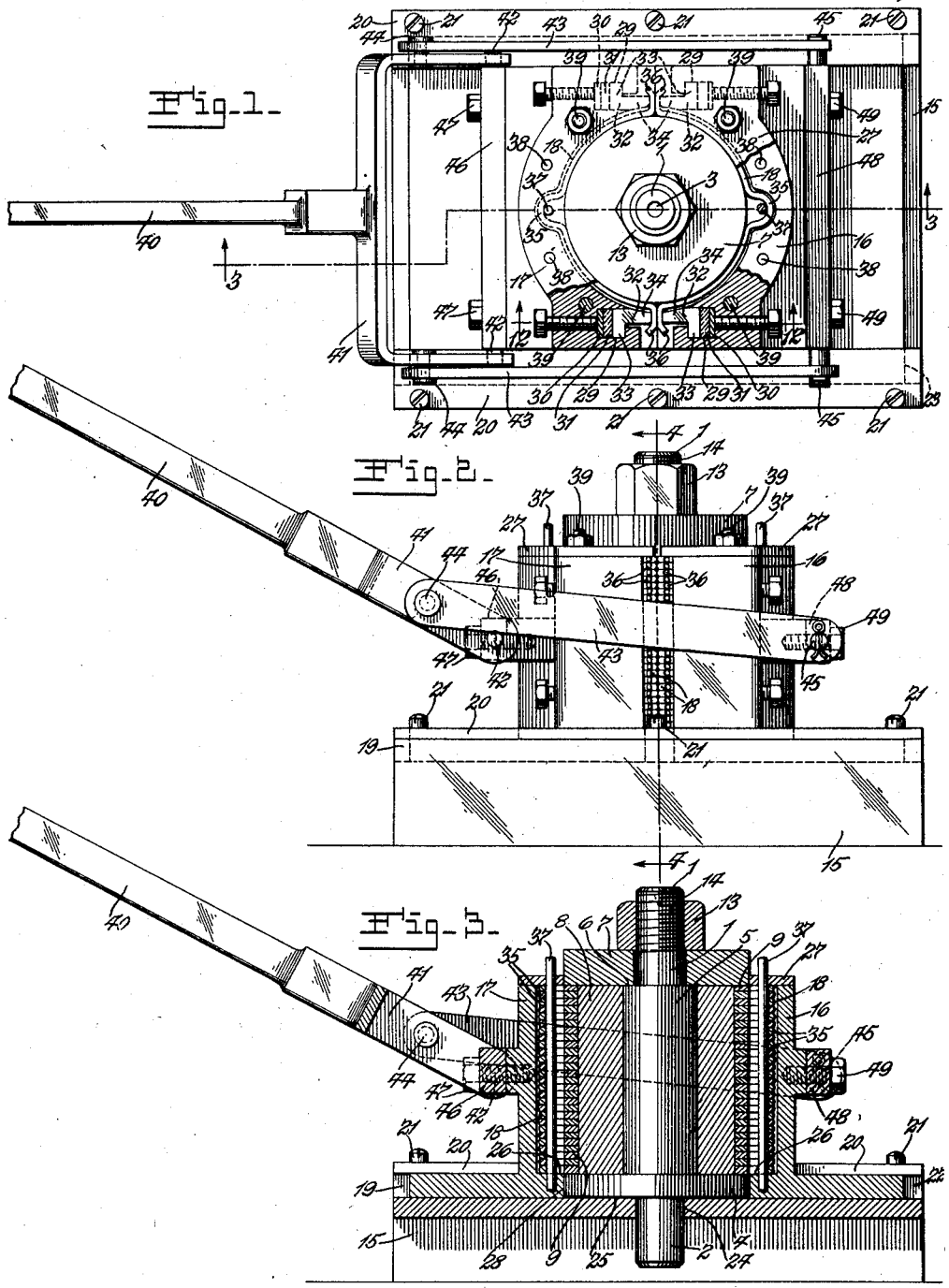

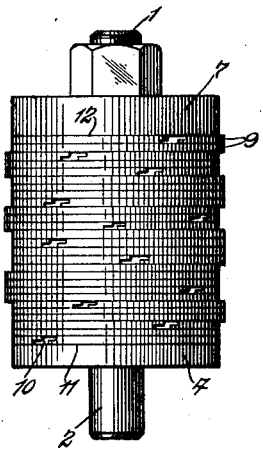

Patented Dec. 15, 1931

1,836,460

UNITED STATES PATENT OFFICE

PETER FLATON, OF ST. LOUIS, MISSOURI, ASSIGNOR TO SAID PETER FLATON, AS TRUSTEE

APPARATUS FOR MAKING PISTON RINGS

Application filed May 12, 1930. Serial No. 451,546.

This invention relates to the art of making metallic piston rings.

A piston ring of the usual type must be resilient and have a gap of substantial size when the ring is in normal position. It must be formed, nevertheless, to an accurate diameter (closed) and this can be most satisfactorily accomplished, if at all, by forming the circumference after the gap is cut. Accordingly, the problem of closing the gap in the ring and holding the ring in closed position while the circumference is being accurately formed, has been a substantial problem. Some of the methods used have been tedious and expensive, others have been inaccurate, and others have resulted in considerable waste in manufacture.

An object of this invention is therefore, to provide a method for making piston rings including a method for closing the rings and holding them so closed while the circumference is being accurately formed, which is simple, economical and efficient.

Another object of this invention is to provide a method whereby a number of piston ring blanks may be closed and held in closed position on one mandrel so that the circumferences of the several rings may be formed at one operation.

A further object of this invention is to provide apparatus which will perform the method described.

Other objects will appear from the following detail description taken in connection with the accompanying drawings, in which:—

Fig. 1 is a top plan view of the apparatus in closed position.

Fig. 2 is a side elevation.

Fig. 3 is a section on line 3—3, Fig. 1.

Fig. 4 is a section on line 4—4, Fig. 2.

Fig. 5 is an end elevation.

Fig. 6 is a side elevation of a part of the apparatus constituting the closing means in open position.

Fig. 7 is a vertical section on line 7—7, Fig. 6.

Fig. 8 is an elevation of the mandrel after the ring blanks have been inserted but before the blanks have been closed or clamped in position.

Fig. 9 is a view of a piston ring of a type referred to in this specification.

Fig. 10 is an illustration of an individual closing element.

Fig. 11 is a view of an individual abutment plate which cooperates with the closing element shown in Fig. 10.

Fig. 12 is a cross-section on line 12—12, Fig. 1.

A mandrel is provided which has a resilient core upon which a number of piston ring blanks may be placed, and after each ring is closed individually the rings are clamped in closed position by means provided on the mandrel. The mandrel with the rings in closed and clamped position, may then be placed in a lathe and the circumference of all of the rings accurately formed in one operation.

Apparatus is also provided in which the mandrel with a set of stacked rings may be placed, and is so constructed that by one operation all of the ring blanks will separately be closed. The closing apparatus is so arranged that after the operation just referred to the clamping means on the mandrel may be operated to clamp the ring blanks so closed and hold them in closed position.

Ring blanks are usually individually cast of grey iron, after which a gap is cut and both are formed so that the blank will have an accurate width. The apparatus and method here described is to provide means for operating on the blanks after the gap has been formed and after the sides have been formed so that the rings are of accurate width in order to accurately form the circumferences of the blanks to make complete piston rings.

A mandrel conveniently shown in Fig. 8, has a central arbor 1, the end 2 of which may be inserted in the chuck of a lathe. The other end has a socket 3 adapted to be engaged by the tail stock of a lathe. A base plate 4 is integral with the arbor 1. The central portion 5 of the arbor may be slightly larger than the remaining portion of the arbor and provides a shoulder 6 at its upper end to form an abutment for a collar 7. A cylinder 8 of resilient material is mounted about the enlarged portion 6 of the arbor 1 and between the abutment plate 4 and the collar 7. The diameter of the resilient body 8 is slightly larger than the interior diameter (closed) of the ring blanks which are to be placed on the mandrel.

A piston ring or blank 9, as shown in Fig. 9, is of the step-cut type being cut so as to provide a gap 10. The blanks 9 are usually cast integrally and are cast with internal circumferences which are accurate enough for the purpose intended and do not require finishing, but are, nevertheless, more or less uneven. The sides 11 and 12 of the ring blanks are ground so that the thickness of the ring will be accurate. This is usually accomplished by placing the casting on a magnetic clutch and grinding first one side of the blank and then the other.

After the blanks 9 have been formed to accurate width and after the gap has been cut, a number of them are stacked on the mandrel about the resilient cylinder 8, the bottom blank resting against the abutment plate 4 and the top blank coming substantially even with the top of the central cylinder 5. As specifically shown in the drawings, the mandrel is adapted to hold 28 blanks. Assuming the blanks to be ⅛ inch in width, the central portion 5 of the arbor will be 3½ inches in length, or slightly less. Thus when 28 blanks are stacked as described above, each one may be individually closed and the collar 7 may be clamped tightly against them and thus hold them in closed position so that the mandrel may be placed on a lathe and all of the rings completed at one operation. The collar 7 may be clamped in position by a nut 13 operating on external threads 14 on the top of the arbor 1.

The means for closing the ring blanks after they have been placed on the mandrel includes a base 15, and a pair of jaws 16 and 17 slidable on the base and adapted to be closed against each other. For the purpose of closing each ring individually each of the jaws is provided with a stack of resiliently mounted and resilient closing elements 18 each one of which is adapted to bear against an individual blank.

The base 15 is formed with an upwardly extending side rail 19 on which is secured plates 20 by screws 21 to form ways 22 to receive bottom flanges 23 on the jaw elements. A socket 24 is adapted to receive the end 2 of the arbor and the top surface 25 of the base forms a support for the abutment plate 4 of the mandrel as well as for the reciprocating jaws 16 and 17. It will thus be seen that the mandrel may be fixed in the base 15, and the jaws 16 and 17 slidably supported on the base, one on each side of the mandrel.

The closing elements 18 are stacked vertically on the jaws 16 and 17, the bottom element resting on an abutment 26 on the base of the jaw. A top plate 27 on each jaw overhangs the top closing element. The base of each jaw has a concave surface 28 to accommodate the abutment plate 4 of the mandrel when it is in position on the base 15, and the top plate 27 also has a concave surface which is adapted to accommodate the collar 7 of the mandrel. The plates 27 do not tightly engage the collar 7 but are such as to provide a clearance so that when the jaws are closed the collar 7 may be forced downwardly against the shoulder 5 on the arbor when the nut 3 is tightened to clamp the rings in position.

A vertical recess 29 is provided on each side of each jaw. A vertical plate 30 is placed in the recess 29 against which is placed a strip of resilient material 31 which may be of gum rubber. Against the resilient strip 31 is stacked a series of bearing elements 32 corresponding in thickness and number to the closing elements 18. The contour of the bearing element 32 is shown specifically in Fig. 11. A heel portion 33 bears against the resilient strip 32 and a head portion 34 provides a bearing for the end of a closing element 18. Thus it will be seen that each of the closing elements 18 has a resilient bearing at each end.

The shape of the closing element 18 is specifically illustrated in Fig. 10. It is substantially semi-circular having a loop 35 at the center, and looped ends 36 adapted to engage respectively about the heads 34 of the bearing element 32 as described. The elements 18 are preferably constructed of wire having a circular cross section. The wire is formed to the contour shown in Fig. 10 and previously described, after which the top and bottom surfaces are ground so that they will be accurate in width. This provides a relatively narrow bearing surface so that each element will bear only against its proper ring blank even though there might be some slight variation in the width or location of the ring blank.

The shell of each of the jaws 16 and 17 is so arranged as to provide a recess for the loop 35, as specifically shown in Fig. 1, and a pin 37 extends vertically of the jaw and inside of the loop portion 35 having one end seated in a socket in the base of a jaw, as shown in Figs. 3, 4 and 7, and the upper end extending through a hole in the plate 27.

The shell portion of the jaws 16 and 17 is provided with dowel pins 38 which pass through and align the top plate 27, which is secured to the jaw by bolts 39.

A lever 40 is provided with a yoke portion 41 the ends of which are pivoted to the jaw 17 on the pins 42. A pair of links 43 are pivoted at one end of the yoke 41 by the pins 44, and at the other end are pivoted to the jaw 17 by the pins 45. The pins 42 may be secured to the jaw 17, as specifically shown in the drawings, by being made integral with a strip 46 which is fastened to the jaw by bolts 47. Similarly the pins 45 may be secured to the jaw 16 by being integral with the strip 48 which is attached to the jaw by the bolts 49.

The number of closing elements 18 with which the jaws are equipped correspond in number and in width to the ring blanks on the mandrel. After the ring blanks have been loosely assembled on the mandrel as previously described, the mandrel is placed in the closing apparatus by inserting the end 2 in the recess 24. Downward movement of the lever 41 closes the jaws and brings opposing closing elements 18 in engagement with an individual ring with which they are adapted to register. Each ring is thereby individually closed. While the lever 41 is in depressed position and the jaws are relatively closed, the nut 13 is tightened against the collar 7 forcing it downward and engaging the column of ring blanks, thus securing them in closed position. The lever 41 may then be released and the mandrel removed from the closing apparatus, placed on a lathe and the outer circumferencs of the rings accurately cut or ground.

It will thus be seen that the invention accomplishes its purpose, that method and apparatus have been provided which are simple and efficient to conveniently produce rings of accurate circumferences.

It is obvious that parts of the invention may be used without the whole and that various changes may be made in details of construction and operation within the scope of the appended claims without departing from the spirit of this invention.

I claim:

1. Apparatus of the class described including a mandrel adapted to accommodate a plurality of ring blanks, means to close the blanks comprising a pair of cooperating jaws and closing elements resiliently and independently mounted on said jaws, and means on the mandrel for clamping the blanks to hold them in closed position.

2. Apparatus of the class described including a mandrel adapted to accommodate a plurality of open ring blanks, means to close the blanks comprising a pair of cooperating jaws and resilient closing elements of the same thickness as the blanks each independently mounted on the jaws, and means on the mandrel for clamping the blanks to hold them in closed position.

3. Apparatus of the class described including a mandrel adapted to accommodate a plurality of open ring blanks, means to close the blanks comprising a pair of cooperating jaws and semi-circular resilient closing elements of the same thickness as the blanks and substantially conforming to their configuration mounted on said jaws, and means on the mandrel for clamping the blanks to hold them in closed position.

4. Apparatus of the class described including a mandrel adapted to accommodate a plurality of open ring blanks, means to close the blanks comprising a pair of cooperating jaws, closing elements of the same thickness as the blanks, and means for loosely mounting said closing elements in stacked relationship on each jaw, and means on the mandrel for clamping the blanks to hold them in closed position.

5. Apparatus of the class described including a mandrel adapted to accommodate a plurality of open ring blanks, means to close the blanks comprising a pair of cooperating jaws and semi-circular resilient closing elements of the same thickness as the blanks and substantially conforming to their configuration resiliently mounted on said jaws, and means on the mandrel for clamping the blanks to hold them in closed position.

6. Apparatus of the class described including a mandrel having a resilient core adapted to accommodate a plurality of open ring blanks, means to separately and simultaneously close the blanks about said core comprising a pair of cooperating jaws and closing elements resiliently and independently mounted on said jaws, and means on the mandrel for clamping the blanks to hold them in closed position.

7. Apparatus of the class described including a mandrel adapted to accommodate a plurality of open ring blanks, means to close the blanks comprising a pair of cooperating jaws, a lever secured to one of the jaws, a link between the other jaw and the lever, and closing elements resiliently mounted on said jaws adapted to separately and simultaneously close the blanks, and means on the mandrel for clamping the blanks to hold them in closed position.

8. Apparatus of the class described including a mandrel adapted to accommodate a plurality of open ring blanks, means to close the rings comprising a base having a socket to provide a seat for the mandrel, a pair of cooperating jaws slidably mounted on the base, and closing elements resiliently and independently mounted on said jaws, and means on the mandrel for clamping the blanks to hold them in closed position.

9. Apparatus of the class described including a mandrel having a support, an abutment plate integral with said support, a resilient core about said support and above said plate and adapted to accommodate a plurality of open ring blanks in stacked relationship, and a removable collar about and in slidable engagement with said support and situated above said core, means for separately and simultaneously closing each of the blanks, and clamping means on the support to close the collar upon the blanks and hold them in closed position on the mandrel.

10. Apparatus of the class described including a mandrel adapted to accommodate a plurality of open ring blanks, means adapted to separately and simultaneously close the rings comprising a base having a socket forming a seat for the mandrel, a pair of jaws slidable on said base, a lever pivoted to one jaw, a link connecting the other jaw and the lever, and a plurality of resilient semi-circular closing elements resiliently mounted on each jaw in stacked relationship, each of said closing elements being of the same thickness as the rings and substantially conforming to their contour, and means on the mandrel for clamping the blanks to hold them in closed position.

11. Apparatus of the class described including a mandrel having a support, an abutment plate integral with said support, a resilient core about said support and about said plate and adapted to accommodate a plurality of open rink blanks in stacked relationship, and a collar about and in slidable engagement with said support and situated above said core, and means for separately and simultaneously closing each of the blanks comprising a base having a socket forming a seat for the mandrel, a pair of jaws slidable on said base, a lever pivoted to one jaw, a link connecting the other jaw and the lever, and a plurality of resilient semi-circular closing elements resiliently mounted on each jaw in stacked relationship, each of said closing elements being of the same thickness as the rings and mounted in a relationship whereby an opposed set of closing elements will register with a blank stacked on the mandrel.

PETER FLATON.